United States Patent [19]
Bennett et al.

[11] Patent Number: 5,826,028
[45] Date of Patent: Oct. 20, 1998

[54] INITIALIZATION OF SWITCHING NETWORKS FOR USE WITH A SCALABLE COHERENT INTERFACE

[75] Inventors: Donald Bruce Bennett; Steven Allen Murphy, both of Apple Valley, Minn.

[73] Assignee: Lockheed Martin Corporation, Bethesda, Md.

[21] Appl. No.: 648,749

[22] Filed: May 13, 1996

[51] Int. Cl.[6] .................................................. H04L 12/00
[52] U.S. Cl. .............................. 395/200.52; 395/200.53; 395/200.6
[58] Field of Search ........................... 395/200.5, 200.52, 395/200.53, 200.54, 200.6; 370/409

[56] References Cited

U.S. PATENT DOCUMENTS

| | | | |
|---|---|---|---|
| 4,833,468 | 5/1989 | Larson et al. | 340/825.8 |
| 4,949,950 | 8/1990 | Freeman et al. | 395/200.6 |
| 5,471,617 | 11/1995 | Farrand et al. | 395/200.53 |
| 5,557,748 | 9/1996 | Norris | 395/200.52 |
| 5,572,674 | 11/1996 | Ernst | 395/200.53 |
| 5,598,532 | 1/1997 | Liron | 395/200.5 |
| 5,634,009 | 5/1997 | Iddon et al. | 395/200.53 |
| 5,634,010 | 5/1997 | Ciscon et al. | 395/200.53 |
| 5,666,486 | 9/1997 | Alfieri et al. | 395/200.53 |

*Primary Examiner*—Lance Leonard Barry, Esq.
*Attorney, Agent, or Firm*—Glenn W. Bowen

[57] ABSTRACT

The Scalable Coherent Interface (SCI) standard of the Institute of Electrical and Electronics Engineers is intended for fast, high throughput, point-to-point, unidirectional links. It is to serve high-performance multiprocessor systems. A number of key elements are defined as part of the protocol for SCI. These include: (a) command.old which is a bit in transmitted packets for detecting stale packets to discard; (b) idle.cc which is an idle bit to be inserted between packets for detecting lost packets which toggles when the idle bit has circulated around the ringlet; and (c) idle.ac which is an idle bit which toggles when all operational nodes have had an opportunity to transmit. In addition, SCI contemplates the implementation of a number of different types of resets, including power reset, upon read or apparent loss of power for more than a second and line reset for clearing circuits but not changing error count registers in the system. An implementation of SCI for a switching network which does not contain full agent switches (i.e., switches that have queues), as contemplated by SCI is disclosed which extends the utilization of the above-noted key elements. This implementation provides for a substantial reduction in the complexity, size, power and costs of the network. The network may be expandable in that it can service more than the current number of required operational rings which have at least one scrubber node and may have one or more other functional nodes therein, while handling misrouted packets by providing recirculation conductive connections to all input and output ports of the network that are not connected to such operational rings.

1 Claim, 2 Drawing Sheets

INITIALIZATION OF SWITCHING NETWORKS FOR USE WITH A SCALABLE COHERENT INTERFACE

BACKGROUND OF THE INVENTION

Field of the Invention

The invention relates to the transmission of data packets on unidirectional point-to-point transmission links, and more particularly to the integration of such point-to-point transmission links with switched networks.

Background Discussion

The Scalable Coherent Interface (SCI) provides services similar to those commonly offered in a computer bus architecture. In a multiprocessor environment, however, the scalability of a traditional bus is limited by physics; specifically, problems associated with tapped transmission lines, reflections and capacitive loading. To overcome these problems SCI uses a collection of fast point-to-point unidirectional links instead of a physical bus.

A packet transfer protocol is used by SCI to implement various transactions on the high speed links. This arrangement scales very well from a small number of nodes to a large number of nodes although the latency, or the time required to send information from one node to another increases linearly with the number of nodes if they are connected in a ring. There are several alternatives to the ring that can reduce latency. The Layered network is one alternative that minimizes latency and also contributes other advantages such as support for fault tolerance.

This document specifies a Layered network switch that is the central component required for constructing Layered networks. It is a 3×3 switch with 3 SCI input ports and 3 SCI output ports. Layered networks using the Layered network switch are compatible with SCI packet formats and protocols.

Terms and Conventions.

For reference consult the following documents: SCI standard/specification: IEEE Std 1596-1992 IEEE Standard for Scalable Coherent Interface (SCI).

Joint Test Action Group (JTAG) standard/specification: IEEE Std 1149.1-1990 (Includes IEEE Std 1149.1a-1993) IEEE Standard Test Access Port and Boundary Scan Architecture.

Layered Network, U.S. Pat. No. 4,833,468, issued 23 May 1989, Brian R. Larson, et al.

Bit and Byte Ordering.

The addressable unit in SCI is the 8-bit byte. SCI packets are constructed from 2-byte (doublet) symbols. Bit zero is always the most significant bit of a symbol, byte zero is always the most significant byte of a symbol, and the most significant doublet of the address always comes first. This is big-endian packet notation.

Numerical Values.

Decimal, hexadecimal, and binary numbers are used within this specification. Decimal numbers are represented in their standard 0, 1, 2 . . . format. Hexadecimal numbers are represented by a string of one or more hexadecimal (0–9, A–F) digits followed by the subscript 16. Binary numbers are represented by a string of one or more binary (0, 1) digits followed by the subscript 2.

Definitions.

This glossary is intended to be a convenient collection of terms used here, rather than an exhaustive dictionary. Definitions from the IEEE 1596-1992 standard are labeled "in SCI."

Command.

In SCI, the second symbol of every send and echo packet. Fields in the command symbol used here are command.mprand command.old.

Command.mpr.

In SCI, carries the maximum ringlet priority. The switch uses this field to mark packets according to their original relationship to idle.cc, as part of the protocol for extending the idle. cc ringlet protocol to the entire system.

Command.old.

In SCI, indicates whether the packet has been through the scrubber. In this system, because the scrubber is the first element in the ringlet after leaving the network, command.old also indicates whether the packet has previously been through the network.

Echo Packet.

In SCI, echo packets are sent by nodes that receive send packets. They confirm to the sender that the send packet was received. They are routed through the network in the same manner as send packets.

Idle Symbol.

In SCI, an idle is a symbol that is transmitted whenever there is no packet being transmitted.

Misrouted Packet.

A misrouted packet is one that leaves the network on the wrong ringlet, that is, a ringlet other than the one containing the packet's destination node. It is possible for a packet to be misrouted more than once, since it does re-enter the network after not finding its destination in the ringlet. Note that a packet is only misrouted while it is not in the network, since the success of its routing is only known then.

Network.

A network is a Layered network consisting of interconnected switches. The switches are arranged in stages, with the first stage accepting symbols directly from ringlets and the last stage sending symbols to ringlets.

One Misroute.

A one misroute (1-misroute) is a misrouted one packet.

One Packet.

A one packet is a packet that is first transmitted when the last idle received on that input port had an idle.cc value of 1. See also command.mpr.

Packet.

In SCI, a packet is a sequence of symbols identified by an initial symbol with the flag bit set. There are several packet formats; the two of primary interest here are send and echo packets.

Ringlet.

In SCI, a ringlet is the closed path formed by the connection that provides feedback from the output link of a node to its input link.

In this document, a ringlet includes one pair of connections to a network, with the scrubber positioned so that it is the first to see symbols as they come from the network.

Ringlets-per-row.

The Layered Network consists of rows of switch chips. Each row can connect to either 1 or 2 ringlets. The ringlets are connected to switch ports 1 and 2.

Scrubber.

In SCI, an element in the ring that performs several maintenance operations on packets—it complements idle.cc and idle.ac, if command.old is clear it sets it, and if set it changes the packet into an echo packet that indicates an error. There must be exactly one scrubber in a ring. In the Layered network, the scrubber must be the first element to process packets after they have left the network. Sometimes, the scrubber is incorporated into the same device as another node. In order that the scrubber be the first node after the Layered network, the device must implement the scrubber as logically before the other node.

SCI Node Interface Chip.

The logic that interfaces a node to an SCI ringlet, one example of which is the VSC7201-SCI DataPump, Vitesse Semiconductor Corporation.

Send Packet.

In SCI, a send packet is a packet that originated at a node as a result of node activity.

Stale Packet.

In SCI, a stale packet is one that returns to the scrubber without being accepted by any node. In this paper a stale packet is a packet that returns to the network from its correctly-routed ringlet. It is addressed to a nonexistent node.

Symbol.

In SCI, a symbol is the information transmitted in one clock period. It includes 16 data bits, a flag and a strobe.

System.

A system is a Layered network and a set of ringlets connected to it

Switch.

A switch refers to the switch-point used to construct the Layered network.

Target Address.

In SCI, the target address is the node ID of the packet's destination. It is the first symbol of every packet and is referred to as targeted.

Zero Misroute.

A zero misroute (0-misroute) is a misrouted zero packet.

Zero Packet.

A zero packet is a packet that is first transmitted when the last idle received on that input port had an idle.cc value of 0. See also command.mpr.

SCI Overview.

The objective of the SCI standard is to provide a high performance interconnect system between processors and memory for tightly coupled, cache coherent data communication. SCI utilizes point-to-point links and passes data packets to avoid the problems of bus design such as shared resource bandwidth bottlenecks and design of multi-drop, high speed backplane transmission lines.

The simplest interconnection of multiple nodes using only point-to-point links is a ring, which sends information in one direction only. The SCI standard expects nodes to be connected in a ring, or in multiple interconnected rings, and some of its protocols depend on the behavior of a ring interconnection.

One method provided in the standard to interconnect rings is with agents, which appear to other nodes on each of two (or more) rings as standard nodes and can transfer information between the rings. Behavior of the nodes internally is not covered by the standard.

Another method provided in the standard to interconnect rings is with an interconnection network, of topology not defined by the standard, provided that the interfaces between the nodes and the network satisfy SCI protocols. The Layered network switch is designed for this method.

Layered Network Overview.

The Layered network switch is designed to support the functionality needed in a modified Layered network. The network is modified such that a 2-plane network that normally requires a 4-by-4 switch is implemented with a 3-by-3 switch. The modification saves significant switch chip area and printed-circuit card area. To provide some background for this role, this section describes the Layered network.

The modified Layered network, shown in FIG. 1, consists of connected Layered network switches and, from a protocol viewpoint, appears to an SCI ring as a wire interconnect—it is neither an SCI agent nor node. In FIG. 1 the cross-hatched, rectangular boxes represent switches of the switching network. The blank circles are the nodes that form the ringlets while the circle with the S in it is the scrubber node. FIG. 1 illustrates an embodiment that is disclosed for the purposes of describing the invention, and may not be a practical embodiment for many applications since the operational ringlets generally would contain at least 1 or 2 more operational nodes, even if the scrubber node could also provide operational functions. When the switches all route packets straight, the effect is of a set of essentially unrelated ringlets. When packets are routed diagonally, they go to different destination ringlets; valid source and destination node ID's are the set of all nodes on all ringlets. The effect of the switch, indeed its purpose, is to implement connection of a large quantity of nodes without paying the delay penalty of a single large ring.

Switch Position.

For reference purposes the Layered network switches are arranged in a matrix of N rows and n+1 columns (n is $\log_2$ N). The left column, which receives SCI packets from rings, is called the first stage or stage 0. The right column, which sends SCI packets to rings, is called the last stage or stage n. The switch rows are numbered from 0 (top) to N−1 (bottom). They are associated with SCI rings; each row can connect to either one or two rings.

Layered network switches are connected in a multi-layer banyan manner. Within the network, each output Port 0 is connected to the input port 0 of the next adjacent switch in the same row (straight across). Each output Port 1 is connected to the input port 1 of the layer 1 diagonal switch in the next stage. Each output Port 2 is connected to the input port 2 of the layer 2 diagonal switch in the next stage. (Diagonal connections are so-called because they connect switches in different rows and appear as diagonal lines in a schematic drawing of a network.)

Ringlet Connections to the Network.

The network supports either one or two ringlets connected to each row. If one ringlet is connected per row, it is connected to input and output ports 2 of the first and last stages of the network, and input and output ports 0 and 1 are each connected for packet recirculation. If two ringlets are connected per row, one is connected to input and output ports 2 of the first and last stages of the network, one is connected to input and output ports 1 of the first and last stages of the network, and input and output ports 0 are connected for packet recirculation.

Enabled Input Port.

An enabled input port is a port that accepts input data consisting of idles and/or packets. All information on disabled input ports is ignored.

Enabled Output Port.

An enabled output port is a port to which packets may be routed. A packet is never routed to a disabled output port.

Recirculation Port.

A recirculation port is a port that connects to a recirculation ringlet.

Recirculation Ringlet.

A recirculation ringlet is a ringlet that connects from an output stage switch to an input stage switch on the same row and does not contain any operational nodes. The ringlet is purely to recirculate misrouted packets from the output of the network back to the input so that the packet can try to be routed again. Idles on recirculation ringlest are ignored.

SUMMARY OF THE INVENTION

The standard IEEE Scalable Coherent Interface for data packet transmitting rings has a protocol for initializing individual ringlets. The invention extends that protocol across a network of switches by an ordered transition of the network from its operational state through the TERMINATE, ABORT, STOP, RESETL and RESETH states back to its operational state in response to the receipt of ABORT, STOP, RESETL or RESETH packets at the switches of the network.

BRIEF DESCRIPTION OF THE DRAWINGS

The invention is described by reference to the drawings in which.

TECHNICAL DESCRIPTION OF THE INVENTION

Layered Network Switch Specification

Figure 1:
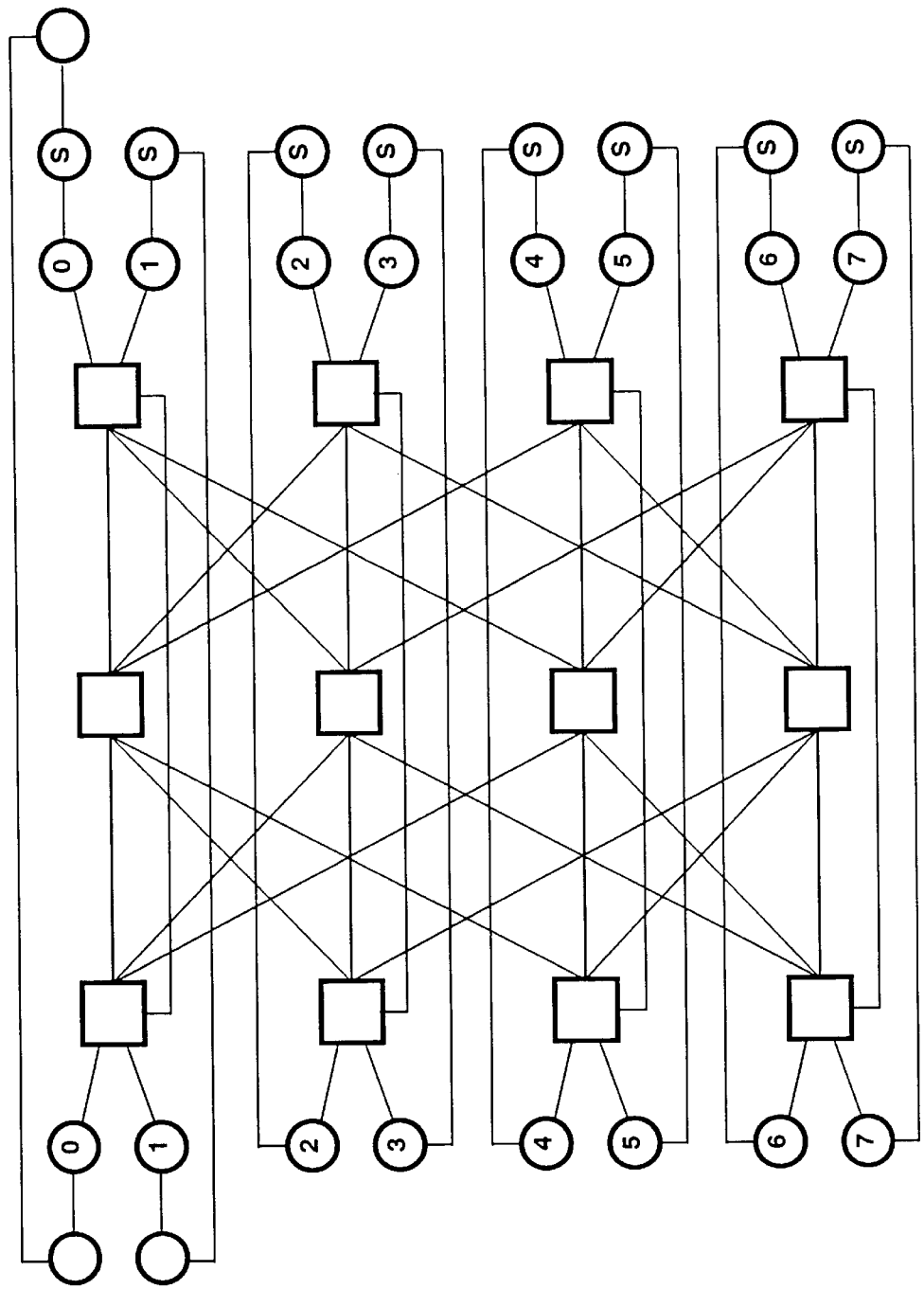
FIG. 1 is a block diagram that illustrates the implementation of a switching network, scrubber nodes and ringlets in accordance with the invention.

Specifications for the Layered Network Switch are:
Summary of Restrictions
The Layered network assumes certain restrictions on the SCI ring in order to implement all of the required SCI protocols. They are collected here for reference:
Scrubber Location
The scrubber must be located immediately after the Layered network and before any nodes in the ring. This implies that any node that contains a scrubber must have it located logically before the node. (A node that violates this restriction cannot be a scrubber, though it could be used as a non-scrubber.)
SYNC Packets
If a node is the scrubber and also uses SYNC packets to train its input port for skew, it must do so during initialization; it must not depend on receiving SYNC packets during normal operation.
Fair Only Nodes
Nodes must operate as fair only. Specifically, packets' command.mpr fields are modified by the switch, and are generally set to zero by the network just before arriving at their destinations. The network always sets idle.ipr and idle.It to zero in idles leaving the network.
Initialization.
The nodes must be either compatible with the SCI standard initialization sequence or go directly to operational mode without sending any initialization packets.
Resetting Two Ringlets Per Row
To assure identical reset phase for the nodes in a two-ringlets-per-row configuration, both ringlet scrubbers in a row must be reset at the node interface at the same time.
ClockStrobe Event00
The clock strobe option in SCI is not supported across the entire network. This protocol depends on the SCI nodes being connected in a ring, which is of course not true in the switched network. However, it is supported on an individual ringlet attached to the network. The Event00 has a targetID equal to the clock master in the ringlet and so will be routed properly by the network. Since there is uncertainty in the transit time through the network due to varying congestion the clock synchronization may not be precise.
Broadcast
The broadcast option in SCI is not supported across the entire network. This protocol depends on the SCI nodes being connected in a ring, which is of course not true in the switched network. However, it is supported on an individual ringlet attached to the network. The Broadcast has a targetID equal to the Broadcast master (or one of the other nodes on the local ringlet for a broadcast resume) in the ringlet and so will be routed properly by the network.
Clocks and RESET
The clock and JTAG clock must be running while the RESET*I pin is active (reset is synchronous).
Special TargetID Packets
Packets with special targetID's ($FFF0_{16}$–$FFF7_{16}$) are ignored and discarded by the network. They are replaced by idles. (These ID's are reserved by the SCI specification for future use, and are not now defined.)
Clear Packets
CLEARL and CLEARH ($FFFA_{16}$, $FFFE_{16}$) packets are ignored and discarded by the network, and are replaced by idles.
Maximum Size Network
The size of time-out counters in the switch limit the network size to less than the SCI limit of 65,520 nodes—up to 2048 ringlets can be supported with the specified counter sizes. Future versions of the switch can have larger counters.

Switch Block Diagram Description

Figure 2:
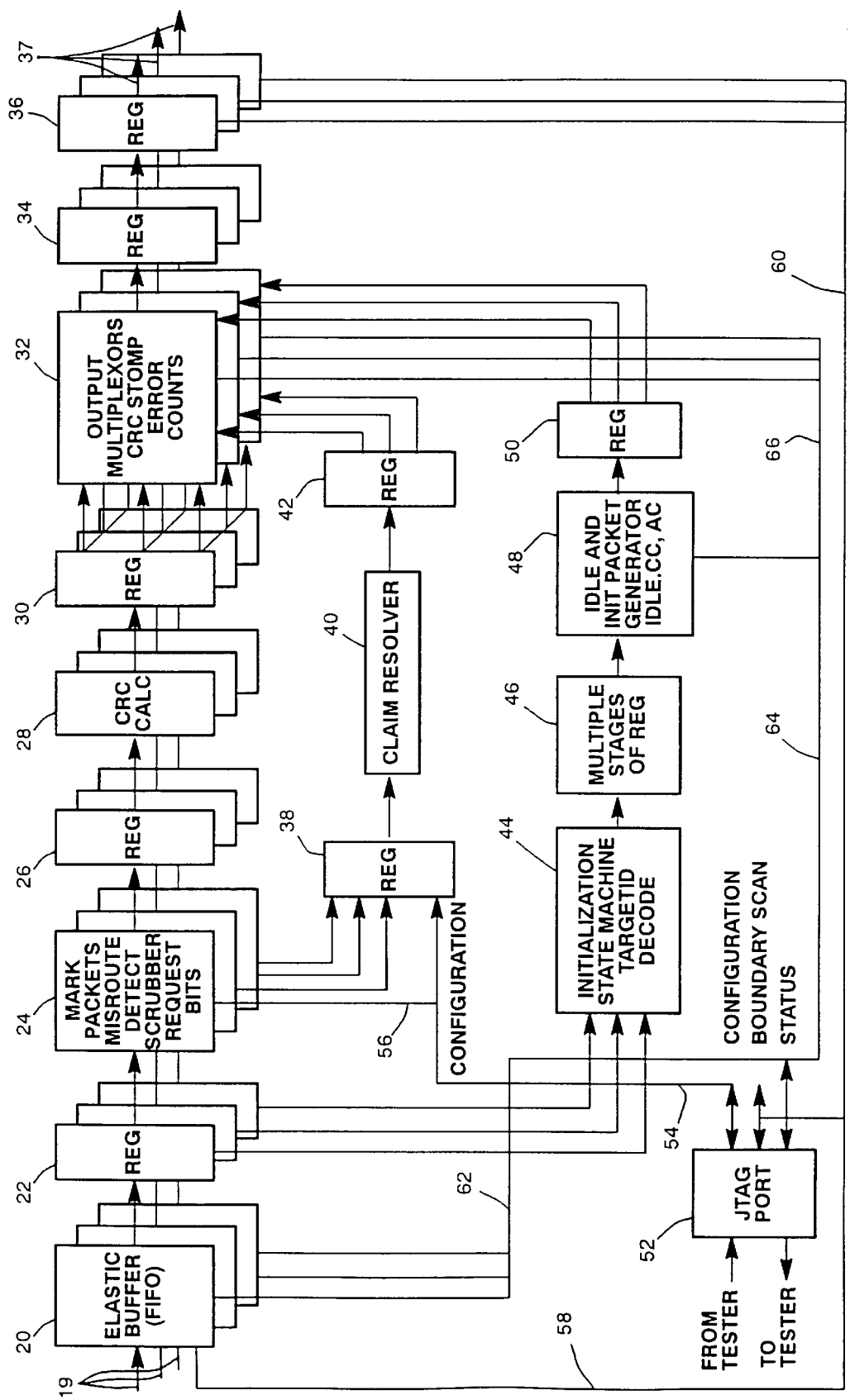
FIG. 2 is a block diagram that shows an implementation of the switches of the switching network of FIG. 1.

The block diagram of the Layered network switch is shown in FIG. 2.
Elastic Buffer 20
Symbols enter the Elastic Buffers 20 which align their timing with the switch's internal clock, detect packet boundaries and insert and delete idles and SYNC packet symbols. The symbol from each of the Elastic Buffers 20 is first strobed into one of two internal registers according to the polarity of the SCI strobe. The two registers form the front end of a four-symbol FIFO that is normally kept half full. When the FIFO fills further, an idle or SYNC symbol is deleted to help empty the FIFO. When the FIFO begins to empty, an idle is inserted (duplicated) to refill it. The output of the FIFO is clocked into register unit 22.

In the packet detection logic 24, symbols are examined to distinguish packets and idle symbols. If the symbol is the first one in a packet, it is further distinguished between an operational packet, an initialization packet and an ABORT packet. If packets arrive with no intervening idles they are routed together, as if they were one packet. The switch will not insert an idle in this case. The output of the packet detection logic 24 is supplied to the registers 26.

Initialization packets, recognized by their targeted values in the range $FFF0_6$ ... $FFFE_{16}$ and a correct Cyclic Redundancy Check (CRC) provided by CRC calculation 28 serve to control the initialization state machine. Arrival of initialization packets is noted by packet type 44, but the packets themselves are discarded.

ABORT packets are recognized by the unique flag pattern of the ABORT packet immediately followed by a SYNC packet: $11111001_2$, and by their targetid value of $FFFB_{16}$. (While there are 6 flag 1's in the ABORT packet, some SCI node interface chips sometimes emit only 5 1's, which is also recognized by the switch.)

STOP packets are recognized by their targeted value of $FFFB_{16}$ and a correct CRC.
Configuration, Boundary Scan, Status 52
This information is supplied via the test port. It identifies the location of the switch in the network rows and columns and supplies the output to the claim Resolver 40 in a form that is convenient for use by the claim Resolver 40, and provides for access to the switch's internal logic, and the interconnect between switches, for test and error recovery purposes.

Misroute Detect, Scrubber, Request Bits, Idle, Targetid Unit 24

Packets are marked for the several SCI protocol activities and the request bits needed for routing are isolated and prepared for the claim resolver 40.

Initialization State Machine 44

When an ABORT, STOP or RESET packet is recognized the switch enters an initialization sequence that is paced by a state machine 44 coupled to receive inputs from the register units 22. State machine behavior is aimed at causing, and responding to, initialization protocols defined for rings in the SCI standard.

CRC Calculator 28

The CRC for packets is checked in this block. The results of the check are given to the next stage register 30.

claim Resolver 40

The two-bit route request values from the three input ports are compared with each other and the availability of output ports, and an allocation decision is made for each. The decisions are sent to the output Multiplexors 32 which supply the output registers 34, 36. When possible, all requests are satisfied by claiming requested output ports; where necessary an unrequested port is claimed. Only operational packets compete for output ports, since initialization packets and idle symbols are absorbed and regenerated.

Idle and Initialization Packet Generator 48

Idles and initialization packets are generated and made available to all output ports according to the state of the initialization state machine 44 which supplies its output to the register 46. The idle and initialization packet generator is in turn coupled to the register 50 which have their outputs coupled to the multiplexor 32.

Output Multiplexors, CRC Stomp, Error Counts 32

The output port symbols are selected from four possible sources according to the initialization state machine 44 and the claim resolver 40 results. Each of the three output multiplexors operates the same way. The possible selections are one of the three input ports' symbols or the initialization/idle generator 48.

The output strobe is the same signal on all three ports. It is one half the frequency of the switch clock, and is clocked the same as the other output port lines.

The multiplexors 32 also mark failed CRC's with a stomped value that marks the packet failure as previously detected. They also count the number of newly detected failures for later analysis and use by the fault control algorithms.

The JTAG port 52 is for test purposes and has configuration outputs on lines 54 to the register 38, and on line 56 to packet detection logic 24 to supply network configuration. The JTAG port also is coupled to the inputs and outputs of the chip for boundary scan purposes, as indicated by lines 58 and 60, respectively. The JTAG port 52 also obtains status signals from the lines 62 to the elastic buffers, from the idle and initialization packet generator 48 on the lines 64 and from the multiplexors on the lines 66.

Physical Layer Description

The physical layer connections consist of three input 19 and three output 37 SCI ports, each containing 18 differential input and output signals, respectively. Each input port x consists of 16 data signals (SCIDIx_0 . . . SCIDIx_15), a flag bit (SCIFIx) used to delimit packets, and a strobe signal (SCISIx) for latching incoming data. Each output port x consists of 16 data signals (SCIDOx_0 . . . SCIDOx_15), a flag (SCIFOx), and strobe (SCISOx). Each 16-bit quantity transferred is called a symbol and is clocked on each rising and falling edge of the strobe signal. All 18 signals transition at the same time every 2 ns (500 Mega-transitions per second) giving an effective data transfer rate of 1 Gbyte/sec. (The switch chip actually operates at 299 Mega-transitions per second worst case.)

Packet and Idle Formats

The SCI standard contains a variety of packet formats. Only those format details that affect the switch's behavior are discussed here. TABLE I through TABLE V illustrate the packet and idle formats. For details not explained here see the SCI specification (IEEE Std 1596-1992).

TABLE I

Send and Echo Packet Formats

| targetId (<FFF0$_{16}$) |
| --- |
| command |
| sourceId |
| ... |
| Cyclic Redundancy Code (CRC) | summary

| tgt | com | src | ... | crc |
| --- | --- | --- | --- | --- | request send

| mpr | spr | phase | old | ech 0 | eh | cmd(<124) |
| --- | --- | --- | --- | --- | --- | --- |
| 2 | 2 | 2 | 1 | 1 | 1 | 7 | request echo

| mpr | spr | phase | old | ech 1 | bsy | res 0 | transactionId |
| --- | --- | --- | --- | --- | --- | --- | --- |
| 2 | 2 | 2 | 1 | 1 | 1 | 1 | 6 | response send

| mpr | spr | phase | old | ech 0 | eh | cmd(≧124) |
| --- | --- | --- | --- | --- | --- | --- |
| 2 | 2 | 2 | 1 | 1 | 1 | 7 |

| mpr | spr | phase | old | ech 1 | bsy | res 1 | transactionId |
| --- | --- | --- | --- | --- | --- | --- | --- |
| 2 | 2 | 2 | 1 | 1 | 1 | 1 | 6 |

TABLE II

Request-Echo Packet Format

| targetId |
| --- |
| command |
| sourceId |
| Cyclic Redundancy Code (CRC) |

TABLE II-continued

Request-Echo Packet Format command

| tgt | com | src | crc |
|-----|-----|-----|-----|

| mpr | spr | phase | old | ech 1 | bsy | res 0 | transactionId |
|-----|-----|-------|-----|-------|-----|-------|---------------|
| 2   | 2   | 2     | 1   | 1     | 1   | 1     | 6             |

TABLE III

Request Packet Format

| targetId |
|----------|
| command |
| sourceId |
| control |
| address Offset {00..15} |
| address Offset {16..31} |
| address Offset {32..47} |
| ext (0 or 16 bytes) |
| data (0, 16, 64, or 256 bytes) |
| Cyclic Redundancy Code (CRC) | summary

| tgt | com | src | cont | A00 | A16 | A32 | ext, data | crc |
|-----|-----|-----|------|-----|-----|-----|-----------|-----|

TABLE IV

Symbol Groups t = T    symbol groups    t = T + N

| send packet | i | i | echo packet | sync packet |
|-------------|---|---|-------------|-------------|
| S           | 1 | (1) | 4         | 8           |

TABLE V

Idle Symbol Encoding Format

← error checking →

| ipr | ac | cc | hg | lg | old | lt | ipr* | ac* | cc* | hg* | lg* | old* | lt* |
|-----|----|----|----|----|-----|----|------|-----|-----|-----|-----|------|-----|
| 2   | 1  | 1  | 1  | 1  | 1   | 1  | 2    | 1   | 1   | 1   | 1   | 1    | 1   |

Send Packet Formats

Send packets, including request and response packets, are recognized by the transition of the flag bit in the symbol stream to 1, by the fact that the symbol is not in the range $FFF0_{16} \ldots FFFF_{16}$, and by the repeat of the flag bit=1 in at least the second through fourth symbols. The value of the first symbol is called "targetid," and contains routing information used by the switch. When a send packet is recognized, part of the second symbol "command" is also decoded. In the first stage if the configuration-specified portion of targetid is not equal to the ring number specified by the configuration, then command.old is cleared to zero. The command.mpr field is also sometimes set by the switch. The end of a send packet is recognized by the transition of the flag bit to 0—the packet ends 4 symbols after this occurs. The flag sequence is: 111 . . . 10000. The CRC in the packet is checked for correctness.

Echo Packet Formats

Echo packets are recognized by the transition of the flag bit in the symbol stream to 1, by the fact that the symbol is not in the range $FFF0_{16} \ldots FFFF_{16}$ and by a flag transition to 0 after a total of 3 one's. Echo packets are 4 symbols long. When an echo packet is recognized, part of the second symbol "command" is also decoded. In the first stage if targetid is not equal to the ring number specified by the configuration, then command.old is cleared to zero. The command.mpr field is also sometimes set by the switch. The flag sequence is: 1110. The CRC in the packet is checked for correctness.

Initialization Packet Formats

Initialization packets are recognized by the transition of the flag bit in the symbol stream to 1 and that the targetid value is in the range $FFF0_{16} \ldots FFFE_{16}$. Initialization packets affect the initialization state machine. Except as specified below, CRC fields are checked for correctness.

ABORT Packet Formats

Whenever the flag bit is 1 in at least 5 adjacent symbols and 0 in exactly the two following symbols (that is, a flag sequence of . . . 11111001), and by the targetid field=$FFFB_{16}$ then an ABORT packet and following SYNC packet is recognized. The CRC field is zero and is not checked.

SYNC Packet Formats

If the flag bit transitions to 1 in the symbol stream, the targetid is $FFFF_{16}$ and the next flag is zero, then a SYNC packet is recognized. The packet length is 8 symbols. The SYNC packet can occur in both initialization and operational states. The CRC field is zero and is not checked.

STOP, RESET and CLEAR Packet Formats

These packets have the flag bit set in the first four symbols and clear in the last four. They are recognized by their targetid values and by a correct CRC. Clear packets are ignored, discarded and replaced by idles when in operational mode, and by sync packets otherwise.

SpecialID Packets

These packets, with targetid's in the range $FFF0_{16}$ to $FFF7_{16}$, are reserved in the SCI standard but have no further definition. Because their targetid does not specify the desired routing and their functions are not known, the switch detects their sizes according to the normal flag protocol (the packet ends four symbols after the flag transitions to 0) and converts them to idles. No CRC check is made.

Idle Symbol Formats

An idle symbol is transmitted whenever no packet is being transmitted. Idle symbols are generally discarded during input and regenerated as needed during output, but some of the bits in the idle symbol are saved. During normal operation, every packet leaving the network is nearly always followed by at least one idle symbol. Idles may be missing because of deletion due to differences in clock frequencies and also when packets arrive at a switch input port with no intervening idles.

Idles within the network carry additional information instead of idle.ipr. However, these idles never leave the network.

Error Handling

The switch records error information that it detects for later transmission via the Test Port 51. It also accepts configuration information via the Test Port for response to error conditions.

Initialization

This section documents the behavior of Layered network switches during initialization. The initialization process begins upon application of power and reset and continues until all ringlets have completed their individual initialization sequences.

The SCI standard (IEEE Standard for Scalable Coherent Interface, IEEE Std 1596-1992) provides five types of reset. The supported types are power_reset and linc_reset; the unsupported types are warm_reset, command_reset and linc_clear. The network supports power_reset and linc_reset and does not specifically support warm_reset, command_reset and linc_clear. However, warm_reset and command_reset would likely operate correctly with nodes that implemented them, since they do not appear to affect the network differently from the supported types; they affect internal node states rather than the network.

The Layered network is designed to operate with the scrubber as the first node after the network in each ringlet. The initialization sequence takes this into account; neither initialization nor normal operation will behave properly if the scrubbers are in other locations.

figuration via the Test Port before the SCI initialization sequence can proceed.

Notification of Reset for Ringlet Nodes

A reset process begins at one or more nodes as an external signal. A scrubber node that is reset responds by sending out ABORT, SYNC and RESETH packets. A non-scrubber node that is reset begins sending out ABORT, SYNC and RESETL packets. Once a RESETH packet is received the non-scrubber node switches to sending RESETH packets. Thus, since the scrubber is the first node in the ringlet, the appearance of RESETH at the network implies that all nodes on the ringlet are in the reset state.

When an SCI node interface chip is reset by its reset pin, it begins with its reset phase PH=0 and ends the initialization sequence with PH =1. When it is reset by a reset packet its phase is unchanged; it ends with PH toggled. The SCI standard also specifies PH=0 upon power up.

Scrubber Assignment

The network requires that the scrubber be located as the first node after the network in each ringlet. Therefore the SCI standard scrubber assignment algorithm is not necessary and the network does not support it. Instead, the fixed scrubber assignment option is supported.

Operational Node ID Assignment

Each ringlet's nodes will have an initial assigned node ID that is unique within the ringlet, but is not unique in the system. (In fact, all of the scrubbers have the same ID.) Each node must therefore have a means of changing that ID to a system operational ID before it can begin normal operation, perhaps some form of software-controlled bootstrap sequence. The operational ID must have the ringlet number in the system-defined position. The SCI node interface chip's operational ID can be set from control and status register (CSR) writes.

Initialization Packets

Initialization packets have their targetid values all in the range $FFF8_{16}$ to $FFFF_{16}$. They are specially recognized by the nodes and by the switches. The packets and idle symbols of interest, as generated by the switch, are given in TABLE VI.

TABLE VI

| | Initialization Packet Values | | | | | | | |
|---|---|---|---|---|---|---|---|---|
| Packet type | Symbol 0 | Symbol 1 | Symbol 2 | Symbol 3 | Symbol 4 | Symbol 5 | Symbol 6 | Symbol 7 |
| ABORT | $FFFB_{16}$ | $FFFB_{16}$ | $FFFB_{16}$ | $FFFB_{16}$ | $FFFB_{16}$ | $FFFB_{16}$ | $0000_{16}$ | $0000_{16}$ |
| STOP | $FFFB_{16}$ | $FFEE_{16}$ | $0000_{16}$ | $0000_{16}$ | $0000_{16}$ | $0000_{16}$ | $0000_{16}$ | $9BCD_{16}$ |
| SYNC | $FFFF_{16}$ | $0000_{16}$ | $0000_{16}$ | $0000_{16}$ | $0000_{16}$ | $0000_{16}$ | $0000_{16}$ | $0000_{16}$ |
| RESETH 0 | $FFFC_{16}$ | $FFEF_{16}$ | $FFFF_{16}$ | $FFFF_{16}$ | $FFFF_{16}$ | $FFFF_{16}$ | $FFFF_{16}$ | $161D_{16}$ |
| RESETH 1 | $FFFD_{16}$ | $FFEF_{16}$ | $FFFF_{16}$ | $FFFF_{16}$ | $FFFF_{16}$ | $FFFF_{16}$ | $FFFF_{16}$ | $537E_{16}$ |
| RESETL 0 | $FFF8_{16}$ | $FFEE_{16}$ | $0000_{16}$ | $0000_{16}$ | $0000_{16}$ | $0000_{16}$ | $0000_{16}$ | $5468_{16}$ |
| RESETL 1 | $FFF9_{16}$ | $FFEE_{16}$ | $0000_{16}$ | $0000_{16}$ | $0000_{16}$ | $0000_{16}$ | $0000_{16}$ | $110B_{16}$ |
| Idles with no go bits* | $02FD_{16}$ | — | — | — | — | — | — | — |
| Idles with go bits (normal idles)* | $0EF1_{16}$ | — | — | — | — | — | — | — |

*These values follow the values of the idles arriving on the input ports.

Ringlet Reset Scenario

In a simple ringlet without a Layered network involved, reset occurs in two stages. First, the nodes cooperate to place themselves in a defined state, and then ringlet software modifies the state to that desired for system operation. With a Layered network, initialization begins with switch con-

System Reset Sequence

"When a node is reset or cleared, it initially outputs an ABORT packet immediately followed by a SYNC packet . . . " (SCI standard, section 3.10.8). In other words, a reset sequence always begins with an ABORT/SYNC packet sequence. However, if there are more than one node in the ringlet, subsequent nodes might not repeat the ABORT if they are not out of synchronization; instead they begin with a STOP and/or a RESET packet sequence. In a ring, this causes all nodes to be initialized, and in a Layered network system this causes all ringlets to be initialized. It is not necessary to provide many individual reset signals in order to reset the system.

Upon detection of an ABORT, STOP, RESETL or RESETH packet, the switch enters initialization state. Abandoning all other activity, it generates ABORT, STOP, RESETL and RESETH packets and idle symbols on all output ports in a timely manner as described below. This has two effects: first, the existence of a reset state somewhere in the system is broadcast to all ringlets, causing their scrubber nodes to enter reset state. Second, the network waits until all ringlets have propagated their normal idle symbols, that is, all ringlets have synchronized their reset activity.

To implement the above scenarios, the switches must properly process initialization packets. Each packet received generally has lots of SYNC packets between them; the SYNC packets are broadcast in like quantity after each broadcast of another kind of packet. Except as specified otherwise, all stages of switches in the network behave the same way for the ports that are not recirculation ports. Initialization packets on recirculation ports are usually ignored (see TABLE VII). Note that once the initialization sequence is started it must be completed to get the switch back to operational state.

state dictated by the incoming packet. Five or six idles are sent so that the strobe on the first symbol of the following initialization packet will be high.

ABORT

While in ABORT state the switch broadcasts ABORT and SYNC packets to all output ports (including those previously sending other kinds of packets). Any additional ABORT packets arriving while the switch is in ABORT state are ignored. The switch recognizes STOP and RESET packets while in abort state.

STOP

A switch in ABORT state or TERMINATE state and recognizing a STOP packet enters stop state after completing its current series of SYNC packets or operational packets, respectively. While in STOP state, it repeatedly broadcasts a STOP packet to all output ports followed by a series of SYNC packets. The switch recognizes RESET packets while in STOP state.

RESETL

A switch in RESETL state broadcasts a RESETL packet, of the phase described below, on its output ports followed by a series of SYNC packets. It continues to broadcast RESETL and SYNC packets until all enabled non-recirculation input ports have received a RESETH packet. (This may happen immediately, for example when the ringlets have only scrubber nodes.)

The network is designed to reset upon occurrence of a single reset stimulus anywhere in the system. Upon power_

TABLE VII

Switch Initialization State Machine Behavior

| State | Output Behavior | Exit Condition and State |
|---|---|---|
| OPERATIONAL | Follow input idles on all active non-recirculation input ports whenever no packets are being sent | On any Abort, Stop or Reset packet, go to Terminate state. |
| TERMINATE | Terminate any current packets by bringing Flag low and sending five or six idles. | On an Abort on an enabled input go to Abort state. Otherwise on a Stop on an enabled input go to Stop state. Otherwise on a Reset on an enabled input go to Resetl state. |
| ABORT | Broadcast one ABORT packet and 1023 or more SYNC packets. | On any Stop on an enabled input go to Stop state. Otherwise on any Reset on an enabled input go to Resetl state. |
| STOP | Broadcast sets of one STOP packet and 1023 SYNC packets. | On a Reset on an enabled input go to Resetl state. |
| RESETL | Broadcast sets of one RESETL packet and 1023 SYNC packets. | On a Reseth packet on each enabled non-recirculation input port go to Reseth state |
| RESETH | Broadcast sets of one RESETH packet and 1023 SYNC packets. | On idles arriving on all enabled non-recirculation input ports go to Flush_Reseth state. |
| FLUSH_RESETH | Broadcast normal idles on all output ports. Follow input idles on all enabled non-recirculation input ports whenever no packets are being sent. | On idles arriving on all enabled input ports go to Operational state. |

Operational

The switch is normally in OPERATIONAL state; it begins operation there upon chip reset (not SCI reset) so it may be used with node interfaces that do not implement the SCI initialization protocol. The switch uses the merged input idles from all active non-recirculation input ports on each output port whenever there is no packet being transmitted.

TERMINATE

Upon receipt of an input packet condition causing initialization, the switch pauses in TERMINATE state to terminate current packets, if any. Then it proceeds to the reset and node initialization, the SCI node interface chips issue RESETL0 or RESETH0, if reset later by a reset packet they will alternately issue RESETL1 or RESETH1 and RESETL0 or RESETH0. Except at power up, the scrubbers will not all have the same phase. In the interest of accepting the latest reset request, the phase of the last reset arriving on any input port is used.

RESETH

A switch in RESETH state broadcasts a RESETH packet, of the same phase as the latest input RESET packet, and a set of SYNC packets on its output ports. It continues to broadcast RESETH and SYNC packets until all enabled non-recirculation input ports have received an idle.

FLUSH RESETH

A switch in FLUSH_RESETH state broadcasts idles while waiting for the idles to arrive at the recirculation port(s), if any. These idles have go bits, idle.ac, idle.cc and idle.old set according to the incoming idles in the same way as during normal operation. This state looks much like normal operation, except that all switches ignore RESET, STOP and ABORT packets.

SYNC Packets

A switch recognizing a SYNC packet, in any initialization or operational state, deletes/strips it, effectively treating it as if it were idles. Note that SYNC packets can also occur at times other than initialization; they are optionally (not by the switch) used for calibration of the link level media. If a node wishes to be the scrubber and also use SYNC packets to train its input port for skew, it must do so during initialization; it must not depend on receiving SYNC packets during normal operation.

Normal Operation

During normal operation the Layered network switch routes incoming packets to output ports according to their targetid values. It resolves conflicting requests to properly route as many of them as possible, routing any remaining requests on the remaining ports.

The switch recognizes send and echo packets in order to determine when they end so that the port can be re-used. It checks CRC values and notes and stomps any errors. (Error information is available to a JTAG controller.)

Routing Algorithm

The first priority in the routing algorithm is completion of packets that have already been routed. No packet (except for the initialization sequences) can displace a packet that started earlier. Output ports in use by already-routed packets, and output ports that are disabled, are unavailable to the simultaneous routing algorithm below.

The two bits from each packet targetid are selected and conditionally complemented according to the Bit_Select and Complement configuration information scanned in from the test port 51. The input ports' requests are assigned in order—port 0, port 1 and port 2. The first condition satisfied in the following list results in assignment:

If output port 2 is requested and available.

If output port 1 is requested and available.

If output port 0 is available.

If output port 1 is available.

If output port 2 is available.

Once assigned, the output port is unavailable for the other simultaneous requests.

Because some requests exit on unrequested ports, they can exit the network to an unrequested ringlet. These requests are called "misrouted" and, since their targetid's are not recognized in the ringlet, will pass through and arrive again at the network. They are repeatedly routed until they arrive on the requested ringlet.

Note that a packet may or may not be ultimately misrouted if an unrequested port is assigned, since there are often opportunities in later stages of the network to compensate for the unrequested route.

Routing of Back-to-back Packets

The idle symbol following a packet is included in the routing of the packet through the switch. The reason the idle is included with a packet is to prevent the switching of packets from creating back-to-back packets. If we allowed switching to create back-to-back packets then long strings of back-to-back packets could be generated via the recirculation ports. If the string were long enough the SCI node interface chips would eventually lose sync due to a lack of idles to insert/delete. Back-to-back packets are created when a switch needs to delete an idle and there is only one idle between packets. If packets are back to back (including packets that end prematurely with a new packet) then they are routed together on the same output port. If a packet immediately follows a specialID packet it will also be converted to idles along with the specialID packet. When packets are routed together the trailing packets are likely to be misroutes since they probably won't have the same targetid. When the back-to-back packets reach an SCI node interface chip it will usually separate the packets by an idle before they return to the network.

Bandwidth Allocation Protocol

This section documents the behavior of the Layered network with respect to standard SCI bandwidth allocation. Several SCI assumptions about ring behavior do not directly apply to the Layered network, so that careful protocol analysis and network behavior are necessary, particularly in the area of bandwidth allocation.

The SCI assumption of ring connection is that there is assurance that symbols arrive in the same order as they were sent (though more elements may be inserted in between), no matter what part of the ring is inspected. The standard discusses interconnection of multiple rings using "agents" that remove data that is addressed outside the ring, completely follow the protocol on the sending ring, and then send the data on another ring, following the receiving ring's protocol. An agent thus appears like a node to the ring; it follows all the protocol. When discussing agents, the SCI standard sometimes refers to the associated rings as "ringlets." Transfer of data between ringlets is considered out of the standard's scope.

Bandwidth Allocation in the Ring

In order to prevent starvation of nodes trying to access the ring, SCI provides bandwidth allocation mechanisms. Information about ring status is communicated in idle symbols as follows (IEEE 1596-1992, section 3.2.11):

Priority—idle.ipr distributes the best current estimate of the ringlet's highest priority.

Allocation Count—idle.ac changes in value when all nodes have had an opportunity to transmit a send packet.

By observing changes in idle.ac, a ring node can assure itself that an addressed node has had an opportunity to respond to a request, at least as far as competing ring traffic is concerned. This assurance depends on the fact that the order of transmission of packets and idle symbol values is never changed.

Circulation Count—idle.cc measures the time taken to travel around the ring. A change in value of idle.cc is a token that notes the completion of a trip around the ring.

By observing changes in idle.cc, a ring node can assure itself that a packet has had time to reach its destination on the ring and its echo to return. If the echo doesn't return, the node can declare an error situation.

Go bits—idle.hg and idle.lg are the high priority and low priority bandwidth allocation control flags. They enable allocation in approximate round-robin order.

Old bit—idle.old, is used in conjunction with idle.hg and idle.lg. It is set by the scrubber and cleared by any node that is currently using the network. If idle.old remains set and the go bits remain clear, the network protocol is violated.

Low-type—idle.lt specifies the idle's priority class and which nodes can consume it without accumulating debt.

Extension to the Switched Network

The Layered network and the ring can be married as shown in FIG. 1. Symbols progress through the ring, through the network and back to the ring. Samples of different ringlet populations are shown. Ringlet 0 has 3 nodes, ringlet 1 has two nodes, and the rest have one node each. The scrubber is labeled S and is the first node encountered in each ringlet. The scrubber must be logically located before the first node.

For a straight setting of the switches, the ordering assumptions of the SCI standard are satisfied; no reordering is necessarily performed by the network. However, if the switches are dynamically changed it is clear that spurious changes might be introduced in idle symbol bit values. Also, it can happen that multiple packets are simultaneously sent to the same network output terminal, creating an overload on that terminal or on switches leading to the terminal. One possible resolution of this situation is to queue the extra packets, but this leads to additional serious problems (tree saturation, hot spots, FIFO queues add to switch complexity, etc.), and the preferred solution is to send the extra packets on different, and wrong, rings. The time they spend going around the wrong ring has the same effect as queuing them, but with fewer bad side effects; they try again each time they go through the network. The extra time also effectively changes the order of packets (if, in a parallel system, there was a definable order in the first place), so that the assumptions about symbol order behavior are violated. The protocols described here are aimed at restoring this sense of ordering so that any individual node's view of the protocol appears to be that of the ring.

System Constraints

In order to provide tractable mechanisms for meeting SCI protocols, the network architecture places constraints on some aspects of system configuration.

System Addressing

The network uses a few of the bits in the SCI node ID to determine its routing. Therefore node ID's must be assigned so that those bits are consistent with the node's position in the system. The bits that are used are selected as part of the network design process, and are collectively called the ringlet number. Typically, in a system with N ringlets, the most significant n ($\log_2$ N) bits are used for the ringlet number. (Full agents typically use similar addressing methods.) However, the switch design is such that any of the SCI node ID bits can be used for routing—they do not need to be contiguous nor do they need to start in any special bit position.

Scrubber Locations

The scrubber in a SCI ring alters several of the bits that affect packet control. These bits must also be interpreted by the network switches, and that interpretation requires that each ringlet's scrubber be located immediately after the network. (This is a constraint not required with a full agent switch.)

Ringlet Priority

The network must mark packets to detect their misroute age in order to implement the idle.cc protocol. This is done by setting new (command.old is zero) packets' priority fields (command.mpr) to specific values. This action overrides any priority values placed there by nodes when they send or pass the packets. As a packet exits from the network to the correct ringlet, the network clears command.mpr to zero. (The network is designed only for use with fair-only nodes, that is, with node.spr=0. Values of 1–3 are replaced as the packet goes through the network and therefore would not have their intended effect.)

Priority is typically used to more closely manage the utilization of a heavily-loaded ring. In a system with a network there is much more freedom to configure the system to avoid heavy loading of any ringlet, so the priority feature is less important. Nodes are more likely to operate satisfactorily without using unfair protocol.

Expansion of Bandwidth Allocation to the System

Nodes constructed for use in SCI rings expect to see ring protocol behavior. When the network is added to a system, the individual node view of system behavior must be preserved. This section introduces preservation conditions before misrouted packets are considered (they will be included in the next section).

Significant Behavior of idle.cc and idle.ac

These bits of the idle symbol are defined so that, in a correctly implemented ring, their values change once each time they travel around the ring. Specifically, each node copies the values from incoming idles to outgoing idles, unchanged except for a single distinguished node (called the scrubber) which copies the complement of the incoming values. Since packets do not get reordered with respect to this bit copying protocol, a sending node can observe the values of these bits to determine when a packet has had time to get to anyplace on the ring.

The idle.cc bit follows the above behavior as described, always copying the bit value immediately (its travel is of course held up by nodes sending packets, since no idle symbols then exist to propagate the value). The idle.ac bit follows the above behavior as described, except that the idle.ac bit is not copied by a node if it is trying to transmit but cannot due to the protocol. Instead, it continues to send idles with the previous value of idle.ac until it has successfully transmitted the packet and received its echo. Thus another node can watch idle.ac and, once it changes, be assured that all nodes have had a chance to transmit to their reserved destinations.

Because of the definition of these bits, certain behaviors, such as idle.ac changing faster than idle.cc, are impossible in a correctly operating ring. The SCI node interface chip recognizes occurrence of some of these impossibilities as error conditions and shuts the system down.

Expansion of idle.cc and ac

Expansion is nearly identical for idle.cc and idle.ac, so in the following both are called idle.xc. If idle.xc is allowed to propagate in an uncoordinated way into the ringlets, there will be many instances of packets and idle.xc bits being reordered from the nodes' viewpoints. The network solution is to assure that all idle.xc instances of the same value (one from each ringlet) have arrived in the network before any of them are allowed to propagate out of the network. These delays make the network look possibly larger than it physically is, and packets can get ahead of their corresponding idle.xc changes. But idle.xc does not get ahead of corresponding packets, so no node time-out error conditions are triggered.

Expansion of idle.ipr, hg, lg, old and lt

The network is designed for propagation in the context of fair protocol. These bits are set in output idles as follows:

ipr—idle priority, which is a measure of ringlet priority, is set to zero in every idle leaving the network. While unfair capable nodes may cause higher priorities to be placed in idle.ipr, they also are placed in command.mpr which would confuse the misroute packet protocol (below). The system constraint to priority level 0 avoids this confusion, since the nodes won't increase command.mpr. (Since packets are typically changing from one ringlet to another, ringlet priority is not very meaningful.)

hg and lg—As the ringlet gets busier, the available go bits are reduced, causing nodes to delay introducing new traffic. (If for some reason go bits are lost completely, no traffic is possible.) To judge the busy-ness of the entire network, switches OR the incoming go bits from enabled non-recirculation ports to determine the outgoing go bit values. (Go bits are cleared by nodes to inhibit other node's transmission. If these bits were ANDed, the system would soon run out of go bits and go to sleep.)

old—To assure that idle.old does not signal a protocol violation if there is activity anywhere in the system, the switches AND the incoming idle.old bits from enabled non-recirculation ports to determine the outgoing idle.old values.

lt—the low-type bit is cleared to zero. The network only handles fair nodes and so it generates all high-type idles.

Misrouted and Stale Packets

The self-routing behavior of packets going through Layered network switches results in some packets going through the wrong ports, as far as their desired destination is concerned.

A stale packet is one that was misaddressed by the system software. It implies that there is a system error of some form, and is not expected to enter into performance issues. It is only necessary that it be correctly identified and processed. SCI defines a special echo that tells the sender what happened, and the network need only route the stale packet to its destination ringlet and then to any ringlet so that it can be tossed by the latter ringlet's scrubber.

Packets can be misrouted for any of several reasons. Occasionally the paths needed through the network are busy with other traffic. More often there are several packets going to the same node; only one can be correctly routed at a time, and the others are misrouted. These packets increase the traffic in the network; they can also end up arriving out of order with respect to nearby idles. The latter is undesirable because it violates assumptions on which SCI protocol is based. Thus, idle.cc and idle.ac must be held up if misrouted packets left the network ahead of them, until the packets return and are correctly routed.

Network Protocols

Protocols are defined for use within the Layered network so that SCI protocols may be preserved in the attached ringlets. They interrelate the advancement of idle symbol control bits to avoid misordering symbols from the viewpoint of the ringlet nodes. They necessarily use extensions of the SCI protocol.

SCI protocol is violated if idle.cc changes too often, that is, faster than the time to send a packet and receive its echo. To avoid this, the network delays the change of output idle.cc values until all ringlets have propagated the change into the network. All idle.cc propagation is synchronized to this degree. The SCI algorithm always refers to changes in values of idle.cc, that is, a zero/one transition has the same meaning as a one/zero transition. For simplicity in the network, however, idle.cc values are synchronized rather than their changes in value, that is, all output idle.cc bits will become zero and will become one at effectively the same time.

If idle.cc does not change, nodes that are waiting for lost echoes will wait forever and their corresponding queue reclamation and other error recovery mechanisms will not be invoked. If idle.cc is changed very slowly, there is no assurance that an improbable but possible extended misroute pattern will cause protocol violation. Also, idle.ac would have to toggle slowly; this causes undesirable waiting in the queue reservation protocol.

SCI protocol is violated if idle.ac changes faster than idle.cc. Idle.ac is supposed to proceed in the same manner as idle.cc, sometimes being slowed by blocked nodes. The network avoids this violation by allowing the network idle.ac outputs to change only after all idle.ac inputs have changed and only when idle.cc is also changing.

SCI protocol is violated if a packet moves more slowly than idle.cc or idle.ac. The network avoids this by allowing all misrouted packets, that originally arrived before the input idle changed, to be properly routed before allowing the output idle.cc (and therefore idle.ac) to change.

The Misrouting Algorithm

This section is explanatory in nature. It describes network behavior as a consequence of the switch behavior that is specified in other sections.

The SCI protocol controls idle.xc, (idle.cc and idle.ac) transitions by having the scrubber complement its value as it passes through while all other nodes pass it unchanged. These values' changes are used to detect lost packets (a kind of time-out) and other protocol violations. Therefore the misrouted packets must be allowed to arrive at their destinations after at most one idle.xc transition is made. The misrouting algorithm assures that idle.cc transitions do not get ahead of packets by holding the transitions up whenever preceding packets are misrouted and therefore delayed. Protection for idle.ac changes is accomplished by observing from its definition that idle.ac cannot proceed faster than idle.cc. The network does not allow idle.ac to change unless idle.cc also is changing; then idle.ac changes one cycle after idle.cc.

When an unmarked packet arrives at the network it is marked with the last state of idle.cc received on that port, which corresponds to the state of idle.cc when the packet was created. If the packet is not misrouted, its relationship with surrounding idles remains essentially the same, and the SCI protocol is preserved. If the packet is misrouted, it proceeds on whatever node or recirculation path it does reach, arriving again soon at the corresponding input port. The first stage recognizes the misrouted packet and broadcasts a warning to all of the final stage switches, using idle symbols, and the final stage switches reset their "stability" counters. The reset inhibits any change in the value of the idle.cc (and therefore idle.ac) bits in exiting idles until enough time has expired for the misrouted packet to be correctly routed. This process is repeated until all similarly marked packets are routed.

The stability counters are set with a counting value large enough that a successful countdown implies that all packets marked with the old value of idle.cc have been routed. Thus, the expiration of any one of them, and its corresponding change in output idle.cc, implies that the entire network is free of such misrouted packets. When an input port recognizes the new value of idle.cc, it broadcasts that fact, in "cc_done" idles, that cause all final stage switches to immediately change their outputs to the new idle.cc value.

It is conceivable, perhaps through an unrelated protocol error, that different output stages could be sending different values of idle.cc, and that the values have all propagated to the network inputs without triggering cc_done. Then at some point in every path through the network there would be a switch seeing disagreeing idle.cc values in its inputs, and no further changes would occur. To recover from this situation, all switches (except the last stage ones) use their stability counters to watch for idle. cc changes and warnings. If neither occurs, the switches force idle,cc to 0 everywhere by broadcasting cc_done(0) idles. (They also record this as an error condition.) The network exists in the following allowable states (Individual switches are not aware of the network state. They contribute to management of network state based purely on local information.):

S0: All stage n (last stage) outputs are emitting idle.cc=0 and there are no misrouted packets circulating.

Note that changes between S0xx and S1xx states only occur if some stability counter has expired (expiration is broadcast to the network via cc_done idles). Due to construction of the algorithm, this can only occur when there are no 0-misroutes and no 1-misroutes, respectively, in the ringlets.

TABLE VIII

Network State Table

| State | State Change Condition | Next State |
|---|---|---|
| S0 | All input idle.cc values = 1 and any stability counter expires | S1 |
| | A 0-misroute is detected | S0m0 |
| | A 1-misroute is detected | S0m1 |
| S0m0 | A 0-misroute is detected | S0m0 |
| | A 1-misroute is detected | S0m0m1 |
| | All 0-misroutes are serviced | S0 |
| S0m1 | All input idle.cc values = 1 and any stability counter expires | S1m1 |
| | A 0-misroute is detected | S0m0m1 |
| | A 1-misroute is detected | S0m1 |
| | All 1-misroutes are serviced | S0 |
| S0m0m1 | A misroute is detected | S0m0m1 |
| | All 0-misroutes are serviced | S0m1 |
| | All 1-misroutes are serviced | S0m0 |
| S1 | All input idle.cc values = 0 and any stability counter expires | S0 |
| | A 0-misroute is detected | S1m0 |
| | A 1-misroute is detected | S1m1 |
| S1m1 | A 0-misroute is detected | S1m0m1 |
| | A 1-misroute is detected | S1m1 |
| | All 1-misroutes are serviced | S1 |
| S1m0 | All input idle.cc values = 0 and any stability counter expires | S0m0 |
| | A 0-misroute is detected | S1m0 |
| | A 1-misroute is detected | S1m0m1 |
| | All 0-misroutes are serviced | S1 |
| S1m0m1 | A misroute is detected | S1m0m1 |
| | All 0-misroutes are serviced | S1m1 |
| | All 1-misroutes are serviced | S1m0 |

S1: All stage n outputs are emitting idle.cc=1 and there are no misrouted packets circulating.

S0m0: All stage n outputs are emitting idle.cc=0 and there are one or more 0-misrouted packets circulating. In S0 state, the ringlet scrubbers are converting idle.cc values from zero to 1. Therefore, new misroutes are being marked as 1-misroutes. All 0-misroutes are older than the new 1-misroutes. All 0-misroutes must be correctly routed before switching to the S1 state. And similarly for the S1 state.

S0m1: All stage n outputs are emitting idle.cc=0 and there are one or more 1-misrouted packets circulating.

S1m0: All stage n outputs are emitting idle.cc=1 and there are one or more 0-misrouted packets circulating.

S1m1: All stage n outputs are emitting idle.cc=1 and there are one or more 1-misrouted packets circulating.

S0m0m1: All stage n outputs are emitting idle.cc=0 and there are one or more 0-misrouted and 1-misrouted packets each circulating.

S1m0m1: All stage n outputs are emitting idle. cc=1 and there are one or more 0-misrouted and 1-misrouted packets each circulating.

Note: The states intentionally do not provide for simultaneous emission of different idle.cc values. While such a state will exist temporarily, it is not significant to understanding the state diagram, and will disappear as soon as the idles carrying state information (cc_done) all reach the last stage and/or the stability periods subsequently expire.

A state table is given in TABLE VIII. The table shows the allowable transitions and the conditions that cause them.

Misroutes are detected by the first stage switches.

To implement the network state behavior, the switches follow the algorithms described in the following sections.

Initialization of idle.cc and idle.ac Values

The initialization process clears all idle.cc and idle.ac values to zero. Eventually all network inputs, having propagated through scrubbers, will therefore become set to one.

Arrival of Packets and Idles from Ringlets

The first stage switch receives packets and idles from the attached SCI ringlets. When idles are arriving the switch copies the values of idle.cc and idle.ac to internal registers so that they are always internally available. The switch responds to the values in the idle as follows:

When the incoming value of idle.cc changes on any enabled, non-recirculation port, the switch broadcasts cc_done idles (see idle format, TABLE X), with the old idle.cc value, to all of its output ports. When an output packet already occupies a port, the cc_done idle is sent after the packet. The current idle.cc value is itself updated when all incoming (enabled, non-recirculation) idle.cc values agree.

The value of idle.ac used in output packets is that of the most recent agreed-upon incoming values in idles from enabled, non-recirculation ports.

When packets are arriving, the switch routes them to corresponding outputs. It also checks command.old and compares the target address with the ringlet number to distinguish between stale and other packets. Stale packets are routed without further changes. Other packets are checked for age:

If command.old is clear, the packet is a new one from the ringlet, and it is marked by placing a value corresponding to the last received value of idle.cc on that port in the command.mpr field. command.mpr is available for use because the system is restricted to fair only.

TABLE IX

Marking new packets

| idle.cc | command.mpr decimal | | binary bit 0 | bit 1 |
|---|---|---|---|---|
| 0 | 2 | | 1 | 0 |
| 1 | 3 | | 1 | 1 |

If command.old is set the packet was previously misrouted or stale in the network and must be routed again. If targeted isn't equal to the ringlet ID, the packet was misrouted, so command.old is cleared and the misroute is announced via a broadcast misroute idle (see TABLE X). Again, if a packet already occupies an output port, the misroute idle is sent after the packet. Otherwise the packet is stale, command.old is not changed and misroute idles are not broadcast. The broadcast guarantees that each output port transmits the misroute idle at least once.

An SCI idle consists of a data byte and a parity byte. Within the network, the idle format is modified according to TABLE X:

TABLE X

Network idle formats

| bit | SCI symbol | Standard description | Network symbol | Description |
|---|---|---|---|---|
| 0 | ipr(0) | Best current estimate of ringlet's highest priority | misroute | 1 => a misrouted packet has arrived at the first stage |
| 1 | ipr(1) | Best current estimate of ringlet's highest priority | cc_done | 1 => a stage n stability counter has expired (implying that there are no misrouted packets marked with the opposite value as viewed by the first stage switches of idle. cc in the system). The stabiiity counter expiring causes idle.cc to toggle. The toggle propagates through the ringlet (the scrubber inverts the toggle) and appears at the first stage. The first stage switch detects a toggle in idle.cc and generates cc done. |
| 3 | cc | Circulation count | cc | Circulation count, and parameter for cc done |
| 2,4–15 | | SCI standard definitions | | SCI standard definitions |

Transfer of Packets and Idles Through Switches

Intermediate stage switches propagate, in idles, their input ports' agreement on idle.cc and idle.ac values. They ignore the misroute markings on packets. When all enabled, non-recirculation input idle.cc's agree then all subsequent output idle.cc values equal the agreed-upon value, otherwise the previous output idle.cc value is used. When all enabled, non-recirculation input idle.ac's have made a transition to a new value then all subsequent output idle.ac values equal the new value, otherwise the previous output idle.ac value is used. The following applies to all switches including the first stage. idle.ac transitions are accumulated and further transitions are ignored until all enabled, non-recirculation inputs have made a transition to the new value and all outputs have transmitted the current value of idle.ac at least once, so that idle.ac can resynchronize across the network in case an idle.ac change straddles an idle.cc change. The idle.ac change can straddle the idle.cc change because the node's can hold up idle.ac independent of idle.cc. The final propagation of agreement on idle.ac may start just as the cc stability period is about to expire. Then, differential delays of idle.ac in the network can cause some last stage switches to change idle.ac and others to not change idle.ac when the stability period expires. On the next idle.cc change the last stage switches that did not change idle.ac the last time will change and all of the last stage switches will now have the same value of idle.ac. Looking at simple input agreement would not provide for resynchronization because the changed idle.ac's would block agreement when they met the old idle.ac's at a switch. The switch guarantees that a new value for the output idle.ac is transmitted at least once on each output port. Transmitting on each output port makes sure that all switches see all transitions of idle.ac so that the network can resynchronize if necessary. No such guarantee is needed for idle.cc since cc_done is used for resynchronization.

Whenever the input idle.cc values disagree, the stability counter is running; when they agree, the stability counter is reloaded. "Stability counter" refers to the counter's function in a stage n switch. In other switches, as discussed here, the counter is used to detect permanent idle.cc disagreement. If the stability counter completes its count time, the event is recorded in Permanent_cc_disagree and cc_done(0) is broadcast to resynchronize idle.cc across the network. This detects permanent idle.cc disagreement on the inputs should it occur.

Whenever a cc_done or misroute idle is received on a non-first stage, enabled input port, that idle is broadcast on all output ports (waiting for packets if necessary). Because idle.cc values can temporarily disagree in different ringlets, the cc_done value in the idle.cc position might not be the same as the current idle.cc value in non-first-stage switches. When a new idle.ac agreement is reached on the input ports, that new agreement is broadcast on all output ports (waiting for packets as necessary).

Departure of Packets and Idles from Network

Misrouted packets that depart the network into a ringlet retain their markings in command.mpr as 0 or 1 packets. Correctly routed packets have their command.mpr fields set to zero.

Idles departing the network keep the same value as previous departed idles until all of the input idles report an agreed new value of idle.cc, and retain that agreement for a predetermined length of time (described below), or until a cc_done idle with opposite value of idle.cc is received. Then they assume the new value. When the new value is assumed, idle.ac is also examined—if there is agreement on its value the value is transmitted, otherwise the old value is transmitted. Idle.ac never changes unless idle.cc is changing. All exiting idles meet the SCI specification for a fair-only system.

Calculation of Waiting Time

The time that the final stage switches must wait is that during which the agreement might be rescinded due to propagation delays in reporting misroutes. This waiting period is called cc_stability_period and is implemented with a linear feedback shift register (LFSR) counter in the last stage switch. In the following, a packet transfer time (PTT) is the time in clock periods needed for a maximum size packet to pass a point in the communications system. It is 144 for standard SCI. The maximum packet length in symbols for some SCI node interface chips is 48, but there can be two adjacent packets due to deletion of an idle symbol at the network input port. Switches route this pair as if it were a single packet, so that the maximum packet length for routing purposes is actually 96 symbols. The shortest packet transfer time is 4 symbols for the echo packets.

Worst Case Scenario

The worst case is when a misroute idle and a misrouted packet arrive at a last stage switch at the same time. The misroute idle resets the stability counter and the counter starts counting immediately. The last stage switch does not do anything with the misrouted packet. This is merely the starting point for counting the time it takes for the packet to traverse a ringlet, generate a misroute idle in the first stage and the time for the misroute idle to make it to the last stage where it resets the stability counter.

Final Stage to First Stage Ringlet Traversal

The misrouted packet continues onto a ringlet. The longest time it can take a packet to get through a ringlet happens when all of the nodes on the ringlet transmit a packet at the same time, filling up all of the bypass FIFO's. The misrouted packet goes through the ringlet, arriving again at the network. It takes the packet the following maximum time to go through the ringlet before getting to the first stage:

longest_packet_thru_ringlet_delay=nodes_per_ringlet* max_node_delay where max_node_delay is the size of the bypass FIFO in the node.

longest_packet_thru_ringlet_delay=nodes_per_ringlet* bypass_FIFO_size

First Stage to Final Stage Broadcast

The first stage switch sees the incoming misroute and broadcasts the misroute idle. The longest that idle can take to get to the last stage is:

longest_idle_first_to_last_stage=No of stages*max stage delay max stage delay=two back-to-back packet times=PTT longest_idle_first_to_last_stage=S*PTT Switch pipeline delays are not included in the calculation because for the worst case a packet is holding up the transmission of the misroute idle at each switch. The idle proceeds through a parallel pipeline to the packet and is ready to go as soon as the packet finishes. The minimum time that it takes a misroute idle to get to the last stage is $S*P_i$ where $P_i$ is the pipeline delay through a switch for an idle. $S*P_i$ is far shorter than S*PTT.

The misroute idle arrives at each last stage switch and all of the stability counters are reset. This occurs at or before the combined time of the ringlet traversal and the first stage to final stage broadcast cc_stability_period=PTT*S+nodes_per_ringlet* bypass_FIFO_size since the stability counters were last reset. (PTT=packet transfer time=2*packet size, S=number of stages in the network.)

If the stability counters are set to expire at a time longer than that time, no misrouted packets of that phase can exist when the time is completed.

(This analysis does not provide for the occasional deleted or inserted idle, which usually affects the results by a clock period or so, but can affect them by a packet length in the case where a single idle between packets is deleted. However, the extra packet length is already included in PTT.)

Detection of Permanent Disagreement

All non-last stage switches use the cc_stability_period counter to act as a time-out on the input idle.cc values disagreeing. If the time-out expires then there is no cc activity in the network and the switch broadcasts cc_done (0). There are two parts to calculating how long a non-last stage switch can see an idle.cc disagreement on its inputs. The first part has to do with the differential time the last stage cc_stability_periods expire. The second part has to do with how long the change in idle.cc takes to propagate to the next to last stage switch.

Definitions of Variables

Packet transfer time: PTT=max_length_packet*2 back_to_back_packets=48*2=96 clocks Number of switch stages in the network: S=4 for a 16 ringlet system. Number of pipeline stages for idles in the switch: $P_i$=8.5 to 11.0 clocks SCI node interface chip bypass_FIFO_size=52 FIFO entries=52 clocks Maximum Differential cc Row to Row Stability Period Expiration The stability counter in a last stage switch starts to count when the input idle.cc values all agree. Two different rows will start at different times if idle.cc is delayed on one path and gets through fast on the others. Assume that all but row 0 straight path gets through in the minimum time and row 0 straight path takes the maximum time. The straight path on row 0 can not reach all of the last stage switches. Therefore, there is at least one last stage switch that can see idle.cc agreement before row 0. The maximum time it can take a cc change to traverse row 0 straight path and arrive at the last stage switch is:

(S-1)*PTT

Again, no pipeline delays are included for the worst case because of the parallel paths in the switches for packets and idles. The minimum time for the fast paths is:

$(S-1)*P_i$

Subtracting the two gives the maximum differential time between the slowest and fastest row:

max_row_to_row_stability_expiration=$(S-1)*PTT-(S-1)*P_i$

The differential time of the stability periods expiring could be shortened by cc_done arriving at the last stage switches. However, the worst case differential time (which is what we want) for cc_done is also $(S-1)*PTT-(S-1)*P_i$.

Maximum Differential cc Row to Row Propagation

Once the slowest row actually changes idle.cc in the last stage that change has to propagate through the node and through the network to the next-to-last stage switch. We go to the next-to-last stage switch because the last stage switch does not check for permanent cc disagreement. Coming out of the last stage switch the idle. cc change can be delayed by PTT. The SCI node interface chip bypass FIFO might be full and so the idle.cc change can be delayed by the size of the bypass FIFO. However, the SCI node interface chip delays an idle.cc change by at least one cycle. If there is another packet of size PTT coming in behind the first packet with the idle.cc change between the two packets then idle.cc will be delayed until after the second packet. To complicate things further the SCI node interface chip always tries to put an idle between back to back packets and so PTT would be reduced to PTT/2. If there is something in the bypass FIFO then the delay in idle.cc is done in parallel with the bypass FIFO emptying and so the extra delay would be the bypass FIFO size and not PTT/2. Therefore, if the bypass FIFO is empty the delay is PTT/2. If there is something in the bypass FIFO then the delay is the bypass FIFO size. Up to this point you have:

PTT+max((nodes_per_ringlet*bypass_FIFO_size), PTT/2)

=PTT+(nodes_per_ringlet*bypass_FIFO_size)

Once the idle.cc change gets to the first stage switch cc_done is broadcast. The counter is reloaded when a switch receives cc_done, ending the count. (The new value of cc will be following behind cc_done.) The maximum delay caused by the cc_done broadcast to the next to last stage switch is $(S-2)*PTT$. The total time from the last stage through the ringlet and then to the next-to-last stage is:

PTT + (nodes_per_ringlet*bypass_FIFO_size) + $(S-2)*PTT$

= $(S-1)*PTT$ + (nodes_per_ringlet*bypass_FIFO_size)

= max_row_to_row_cc_propagation

Maximum Permanent cc Disagreement Time

The maximum time the next to last stage switch can see idle.cc disagreement is then:

max_row_to_row_stability_expiration + max_row_to_row_cc_propagation

= $(S-1)*PTT-(S-1)*P_i$ + $(S-1)*PTT$ + (nodes_per_ringlet* bypass_FIFO_size)

= $2*(S-1)*PTT-(S-1)*P_i$ + (nodes_per_ringlet* bypass_FIFO_size)

= $(S-1)*(2*PTT-P_i)$ + (nodes_per_ringlet*bypass_FIFO_size)

= perm_cc_disagree time-out period

This is approximately twice the size of the cc_stability_ period. The probability of having every stage have a full PTT delay is very low. A more typical case is for the delay through each stage to be PTT/2 or just one packet size instead of 2. (This argument also applies to cc_stability_ period.)

Number of Ringlets Supported

The switch chip has an 11 bit linear feedback shift register counter that will be used for both the cc stability period and the permanent cc disagree time-out. This counter can count to 2,047. To find out how many ringlets an 11 bit counter can support solve perm_cc_disagree for S (1 node per ringlet):

S=1+(perm_cc_disagree-(nodes_per_ringlet* bypass_FIFO_size))/$(2*PTT-P_i)$ max_S=1+(2047-52)/(2*96-8.5)

max_S=11.9

Therefore, we can support a maximum of 11 stages which provides for up to 2,048 ringlets (2 ringlets per row). This is a reasonable number of ringlets for the prototype system. If we use PTT/2 instead of PTT we have:

max_S=(2047-52)/(2*48-8.5)+1 max_S=23.8 which is more than SCI can handle in the first place.

What is claimed is:

1. A method of extending the SCI standard initialization protocol for a switching network which implements the following initialization states:

(a) OPERATIONAL,
(b) TERMINATE,
(c) ABORT,
(d) STOP,
(e) RESETL,
(f) RESETH,
(g) FLUSH_RESETH, comprising:
(a) transitioning said switching network from its OPERATIONAL state upon detection at any switch of said network of either an ABORT, a STOP, a RESETL or a RESETH packet on any enabled input port to its TERMINATE state,
(b) terminating the transmission of current packets through said network while in the TERMINATE state, and
(c) transitioning in priority order said switching network from the TERMINATE state upon the detection at any switch of said network on any enabled input port of
(i) an ABORT packet to an ABORT state, or (ii) a STOP packet to a STOP state, or
(iii) either a RESETL or a RESETH packet to a RESETL state, and (d) each time the switch enters an ABORT state broadcast, a single ABORT followed by a plurality of sync packets to all output ports of said switch, and each time the switch enters a STOP, a RESETL or a RESETH state broadcast, a respective STOP, RESETL or RESETH packet to all output ports of said switch along with a plurality of sync packets and then repeat until transitioning out of the respective state, and (e) if in an ABORT state, transitioning in priority order said network from said ABORT state upon the detection of:
(i) a STOP packet on any enabled input port to said STOP state, or
(ii) either a RESETL or a RESETH packet on any enabled input port to said RESETL state, or (f) if in said STOP state, transitioning said network from said STOP state upon the detection of
(i) either a RESETL or a RESETH packet on any enabled input port to said RESETL state, or (g) if in said RESETL state, transitioning said network from said RESETL state upon detection of a RESETH packet on each enabled input port to said RESETH state, or (h) if in said RESETH state, transitioning said network from said RESETH state upon the detection of idles on each enabled, non-recirculation input port to a FLUSH-RESETH state, and (i) while in said FLUSH-RESETH state broadcasting idles to all output ports of said switch and transitioning from said FLUSH-RESETH state upon detection of idles on all enabled input ports of said network to said OPERATIONAL state.

* * * * *